United States Patent Office 2,833,695
Patented May 6, 1958

2,833,695

PRODUCTION OF DEXTRAN-DEXTRINASE

Earl R. Kooi, La Grange, Ill., assignor to Corn Products Refining Company, New York, N. Y., a corporation of New Jersey No Drawing. Application June 24, 1955
Serial No. 517,913

8 Claims. (Cl. 195—66)

This invention relates to the production of dextran-dextrainase and concomitant production of ketoses.

Various substrates, e. g., dextrose, partially hydrolyzed starch, have been used in the preparation of dextran-dextrinase but the activity of the enzyme so produced is low. Furthermore, the main by-product of the fermentation, gluconic acid, makes the system acidic and thereby inhibits enzyme formation. Accordingly, the main object of this invention is to provide an improved process for making dextran-dextrinase. Other objects will appear hereinafter.

I have discovered that polyhydric alcohols, e. g., sorbitol, mannitol, glycerol, when used as a substrate for the production of dextran-dextrinase, give substantially higher yields of the enzyme. No substantial amounts of acid are produced therefrom and separation of the enzyme from the ketose by-products is simple, e. g., by precipitation with water miscible organic compounds, acetone, alcohol, etc., in the presence of dextran as claimed in co-pending application Serial No. 517,912. The ketose is recovered from the supernatant liquor. The dextran-dextrinase, which is contained in the precipitate, may be used, if desired, for the conversion of partially hydrolyzed amylaceous material to dextran.

In carrying out the invention, the polyhydric alcohol is mixed with an organic nitrogenous material, such as yeast extract, corn steep liquor, and the like. This medium is sterilized in conventional manner, the pH adjusted to about 3.5 to about 7.5, and then inoculated with a culture of *Acetobacter capsulatum* or *Acetobacter viscosum*. The medium is then incubated under conditions conducive to the formation of dextran-dextrinase. To the liquor may then be added a partially hydrolyzed amylaceous material which is thereupon converted to dextran by the dextran-dextrinase. After the conversion to dextran is completed, the dextran is separated from the ketose and residual carbohydrate by precipitation with a water-miscible solvent. The ketose may then be separated from the carbohydrate by evaporation and crystallization. Alternately and preferably, after formation of the dextran-dextrinase and ketose, the dextran-dextrinase may be precipitated and separated.

The following examples which are typical and not limiting in any sense will further illustrate the invention.

EXAMPLE I

Media composed of 0.5 gram of yeast extract per 100 milliliters and of various carbon sources were sterilized, adjusted to pH 6.0, and inoculated with 10 percent by volume of a culture of *Acetobacter capsulatum* grown 24 hours on 2 percent sorbitol and 0.5 percent yeast extract medium. After fermentation for 16 hours in shaken flasks with aeration, the liquors were adjusted to pH 4.5, 1 percent by volume of toluene was added to prevent oxidation of glucose by the glucose dehydrogenase enzyme present. To 100 milliliters of culture liquor was added 15 grams dry substance of a 17 D. E. acid hydrolyzate of corn starch. The mixtures were then incubated for 16 hours at 28–30° C. with constant agitation. The rate of dextran formation (dextran-dextrinase activity) was measured. It is evident (Table I) that the polyhydric alcohols, e. g., mannitol, glycerol, and sorbitol, are excellent substrates for production of dextran-dextrinase.

*Table I*

PRODUCTION OF DEXTRAN-DEXTRINASE ON DIFFERENT CARBON SOURCES

| Carbon Source | Amount of Carbon Source, Grams per 100 ml. | Comparative Dextran-Dextrinase Activity, percent | Fermentation By-Product |
|---|---|---|---|
| Mannitol | 2 | 100 | Fructose. |
| Glycerol | 2 | 96 | Dihydroxyacetone. |
| Sorbitol | 2 | 83 | Sorbose. |
| 17 D. E. Starch hydrolyzate | 4 | 57 | Gluconic acid. |
| Dextrose | * 0.5 | 39 | Do. |
| Inositol | 2 | 22 | Inosose. |

* The use of higher dextrose concentration will result in lesser dextran-dextrinase formation because of the excessive acidity produced.

EXAMPLE II

Media containing 2 grams of sorbitol and 0.5 gram of yeast extract per 100 ml. were sterilized, adjusted to various pH values, and inoculated with a culture of *Acetobacter capsulatum*. After fermentation for 16 hours with constant agitation and aeration, the liquors were adjusted to pH 4.5 and 1 percent by volume of toluene was added.

The activity of the culture liquors was determined on starch hydrolyzate. To 100 ml. of each culture liquor was added 15 grams dry substance of a 17 D. E. hydrolyzate of corn starch. The mixtures were then incubated at 28–30° C. for 16 hours with constant agitation and the rate of dextran formation determined. A portion of the culture liquor was analyzed for sorbose content. The data (Table II) show that simultaneous production of sorbose and dextran-dextrinase occurs over a wide range of initial pH values.

*Table II*

PRODUCTION OF DEXTRAN-DEXTRINASE ON SORBITOL MEDIUM

| pH | | Growth, Percent of Maximum | Conversion of Sorbitol to Sorbose, Percent | Comparative Dextran-Dextrinase Activity Percent |
|---|---|---|---|---|
| Initial | Final | | | |
| 3.5 | 3.8 | 61 | 99 | 70 |
| 4.0 | 4.1 | 70 | 100 | 83 |
| 4.5 | 4.5 | 83 | 98 | 100 |
| 5.0 | 4.7 | 88 | 97 | 100 |
| 5.5 | 4.8 | 94 | 97 | 91 |
| 6.0 | 4.9 | 97 | 96 | 61 |
| 6.5 | 5.0 | 97 | 98 | 48 |
| 7.0 | 5.0 | 100 | 98 | 44 |
| 7.5 | 5.3 | 95 | 98 | 35 |

EXAMPLE III

Media containing 0.5 gram of yeast extract per 100 ml. and various amounts of sorbitol were sterilized, adjusted to pH 6.0, and inoculated with a culture of *Acetobacter capsulatum*. After fermentation under conditions of constant agitation and aeration, the liquors were analyzed for sorbose content and for dextran-dextrinase activity as described above. The results (Table III) show that sorbose and dextran-dextrinase enzyme are simultaneously and efficiently produced over a wide range of initial sorbitol concentrations.

*Table III*

| Initial Sorbitol Concentration, Grams per 100 ml. | Time of Fermentation, Hours | Conversion to Sorbose, Percent | Comparative Dextran-Dextrinase Activity, Percent |
|---|---|---|---|
| 2 | 16 | 90 | 81 |
| 5 | 16 | 89 | 100 |
| 10 | 40 | 89 | 85 |
| 15 | 120 | 91 | 73 |
| 20 | 120 | 88 | 62 |

EXAMPLE IV

This example illustrates the separation of dextran-dextrinase from the sorbose.

Dextran-dextrinase was produced from sorbitol as described in Example 1. To the culture liquor at pH 4.5 was added one percent dextran and 25 to 30 percent of acetone to precipitate the enzyme. The precipitate was dissolved in water and used in the production of dextran from starch hydrolyzate as described in Example 1. The supernatant liquor from the precipitation of the enzyme contained 98 percent sorbose based on the weight of sorbitol added. From the enzyme-converted starch hydrolyzate was obtained 35 percent dextran based on the weight of starch hydrolyzate added.

I claim:

1. In the production of dextran-dextrinase and ketoses by fermentation of a nutrient solution by a dextran-dextrinase producing organism, the improvement which comprises increasing the yield of dextran-dextrinase by supplying carbon to said solution in the form of a polyhydric alcohol and fermenting the solution with an organism selected from the group consisting of *Acetobacter capsulatum* and *Acetobacter viscosum* and recovering dextran-dextrinase therefrom.

2. The method of producing dextran-dextrinase and ketoses which comprises increasing the yield of dextran-dextrinase by culturing an organism from the group consisting of *Acetobacter capsulatum* and *Acetobacter viscosum* in a nutrient medium containing an added polyhydric alcohol as the source of carbon at a pH within the range of about 3.5 to 7.5 until a substantial amount of enzyme is produced and recovering dextran-dextrinase therefrom.

3. Process according to claim 1 wherein the polyhydric alcohol is sorbitol.

4. Process according to claim 1 wherein the polyhydric alcohol is mannitol.

5. Process according to claim 1 wherein the polyhydric alcohol is glycerol.

6. Process according to claim 2 wherein the polyhydric alcohol is sorbitol.

7. Process according to claim 2 wherein the polyhydric alcohol is mannitol.

8. Process according to claim 2 wherein the polyhydric alcohol is glycerol.

References Cited in the file of this patent

UNITED STATES PATENTS 2,689,816     Kooi                 Sept. 21, 1954

OTHER REFERENCES

"Proc. Soc. of Exptl.: Biol. & Med.," vol. 71, 1949, pp. 336 to 339.

"Bacteriology," 1938, by F. W. Tanner, page 94, publ. by John Wiley & Sons, Inc.

"Fundamental Principles of Bacteriology," 1948, by A. J. Salle, publ. by McGraw-Hill Book Co. Inc. of New York, pp. 381 to 383.